(12) United States Patent
Lim

(10) Patent No.: US 10,768,302 B2
(45) Date of Patent: Sep. 8, 2020

(54) POSITIONING SYSTEM USING INVISIBLE LIGHT, SOUND AND RADIO FREQUENCY SIGNALS

(71) Applicant: Dong-Kwon Lim, Seoul (KR)

(72) Inventor: Dong-Kwon Lim, Seoul (KR)

(*) Notice: Subject to any disclaimer, the term of this patent is extended or adjusted under 35 U.S.C. 154(b) by 352 days.

(21) Appl. No.: 15/568,527

(22) PCT Filed: Mar. 4, 2016

(86) PCT No.: PCT/KR2016/002182
§ 371 (c)(1),
(2) Date: Oct. 23, 2017

(87) PCT Pub. No.: WO2016/171387
PCT Pub. Date: Oct. 27, 2016

(65) Prior Publication Data
US 2018/0113214 A1    Apr. 26, 2018

(30) Foreign Application Priority Data
Apr. 23, 2015  (KR) ......................... 10-2015-0057518

(51) Int. Cl.
| | | |
|---|---|---|
| *G01S 17/86* | (2020.01) | |
| *G01S 1/70* | (2006.01) | |
| *G01S 5/16* | (2006.01) | |
| *G01S 5/02* | (2010.01) | |
| *G01S 13/42* | (2006.01) | |
| *G01S 15/00* | (2020.01) | |

(52) U.S. Cl.
CPC ............... *G01S 17/86* (2020.01); *G01S 1/70* (2013.01); *G01S 5/0263* (2013.01); *G01S 5/16* (2013.01); *G01S 13/42* (2013.01); *G01S 15/00* (2013.01)

(58) Field of Classification Search
None
See application file for complete search history.

(56) References Cited

U.S. PATENT DOCUMENTS

| | | | | |
|---|---|---|---|---|
| 7,298,327 B2* | 11/2007 | Dupray | ................ | G01S 1/026 342/451 |
| 7,576,694 B2* | 8/2009 | Anjum | ................. | H04W 64/00 342/464 |
| 8,639,640 B1* | 1/2014 | Kadous | ................ | G06N 20/00 706/12 |
| 2012/0129546 A1* | 5/2012 | Yang | .................... | H04W 64/00 455/456.1 |

(Continued)

FOREIGN PATENT DOCUMENTS

| | | |
|---|---|---|
| KR | 1020050095401 | 9/2005 |
| KR | 1020070112666 B1 | 11/2007 |

(Continued)

*Primary Examiner* — Marcus E Windrich
(74) *Attorney, Agent, or Firm* — Bay State IP, LLC

(57) ABSTRACT

Disclosed is a positioning system and a node network. A terminal included in the present invention is characterized by an invisible light sensing unit that detects invisible light signals, that were emitted from one or more signaling nodes with the same intensity, carrying the location data of each signaling node; and a controller that calculates the user's position based on the location data included in one or more invisible light signals and their received signal strength.

6 Claims, 7 Drawing Sheets

(56) References Cited

U.S. PATENT DOCUMENTS

| | | | | |
|---|---|---|---|---|
| 2014/0095607 A1* | 4/2014 | Fraccaroli | ............... | G06Q 50/01 |
| | | | | 709/204 |
| 2014/0274119 A1* | 9/2014 | Venkatraman | ......... | H04W 64/00 |
| | | | | 455/456.1 |
| 2015/0091757 A1* | 4/2015 | Shaw | ................... | H04W 64/006 |
| | | | | 342/385 |
| 2015/0133173 A1* | 5/2015 | Edge | .......................... | G01S 1/66 |
| | | | | 455/456.6 |
| 2015/0309180 A1* | 10/2015 | Jiang | .................... | G01C 21/206 |
| | | | | 701/468 |
| 2015/0323646 A1* | 11/2015 | Lin | ........................... | G01S 5/14 |
| | | | | 342/464 |
| 2015/0330795 A1* | 11/2015 | Srinivasan | ............ | G01C 21/206 |
| | | | | 701/522 |
| 2016/0054440 A1* | 2/2016 | Younis | ................... | G01S 13/753 |
| | | | | 342/5 |
| 2016/0139238 A1* | 5/2016 | Bekkali | ................. | G01S 5/0252 |
| | | | | 342/463 |
| 2017/0234962 A1* | 8/2017 | Yang | ..................... | G01S 5/0252 |
| | | | | 342/465 |

FOREIGN PATENT DOCUMENTS

| | | |
|---|---|---|
| KR | 1020080100066 B1 | 11/2008 |
| KR | 1020100073744 A | 7/2010 |
| KR | 1012026130000 B1 | 11/2012 |
| KR | 1013037290000 B1 | 9/2013 |

* cited by examiner

POSITIONING SYSTEM USING INVISIBLE LIGHT, SOUND AND RADIO FREQUENCY SIGNALS

FIELD OF INVENTION

The present invention relates to a positioning system and a node network that provide the exact location of a user in indoor spaces.

BACKGROUND

In general, existing positioning systems needed to provide LBS's (Location Based Services) can be mostly classified into network-based schemes that use RF (Radio Frequency) signals from cell phone towers, schemes that use signal strengths of AP (Access Point) or Bluetooth beacons, and schemes using GPS signals.

Although some of these schemes are suitable in an outdoor environment where RF signals can be received well, they may not be suitable for radio shadow areas such as some indoor spaces, and may require expensive transmitters and receivers as well as extra relaying stations. In the case of schemes that use AP's (Access Point) and Bluetooth beacons, the scanning frequency of many personal devices are not frequent enough, and users may have to turn on the Wi-Fi or Bluetooth function of the device.

In indoor spaces where GPS signals can't reach easily, it's very difficult to provide information of facilities or objects, the best way of traveling, navigation or directories based on user's location. Measuring received signal strength of different signaling devices that have different signal strength can lower the accuracy and requires periodic surveys of AP's and beacons in the area.

With regards to similar positioning systems, a reference called "Three-dimensional spatial localization apparatus using sound wave or ultrasonic wave propagation time" in Korea Patent Publication No. 10-2005-0095401 exists.

BRIEF SUMMARY OF THE INVENTION

Objective

The objective of the present invention is to provide a terminal and a node network that can provide the accurate location of the user in indoor spaces.

Solutions

In order to the above objective, the present invention utilizes; a receiver that detects one or more signals from nodes that transmit invisible light, sound, and RF signals each with the same intensity containing location information of each nodes; a controller that determines the location of the user from the location information contained in one of more invisible light, sound, and RF signals as well as the intensity of these signals.

In addition, the present invention includes; a transmitter on a terminal device that sends a location request signal to signaling nodes that will transmit invisible light, sound, and RF signals containing unique ID, latitude, longitude, altitude, channel information, time of transmission, ID of position requesting device, etc.; detectors for invisible light, sound, and RF signals on the terminal device that receive signals from one or more nodes that transmit invisible light, sound, and RF signals each with the same intensity on different channels; and a controller that calculates the terminal's position from one or more invisible light, sound or RF signals that were detected.

Advantages of the Invention

As described above, the present invention has an advantage of calculating the user's location by utilizing at least one of invisible light, sound, and light.

Additionally, the node network of the present invention transmits signals only when there's a request from a terminal which can save a great deal of electricity. The present invention can calculate the user's location from ratios of the intensity of invisible light, sound, and RF signal and doesn't rely on timers or synchronization of timers on different devices. Since, all signaling nodes transmit signals with the same strength, the present invention also doesn't require periodic area surveys of signals nor relies on the specific signal strength data of each signaling devices.

DESCRIPTION OF THE KEY COMPONENTS

Figure 1:
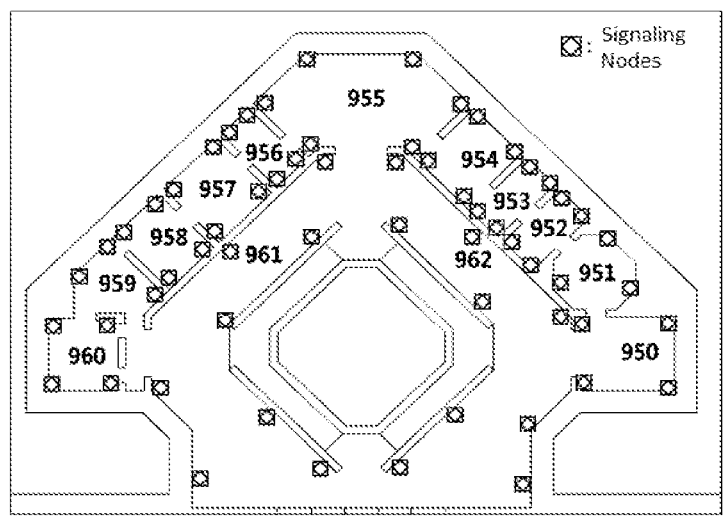
FIG. 1 is a view showing a map and nodes that is provided to the terminal according to an embodiment of the present invention.

100: terminal 110: terminal controller
120: display 130: wireless communication unit
140: invisible light sensor 150: RF transmitter
160: RF receiver 170: terminal timer
180: sound receiver 190: input
200: signaling node 205: main Body
210: node controller 220: node wireless/wire communication unit
230: node timer 240: RF receiver
245: RF transmitter 250: sound transmitter
260: sound reflector

DETAILED DESCRIPTION OF THE INVENTION

Detailed descriptions of the present invention with reference to accompanying drawings are described hereafter. It is to be understood that repeated descriptions, notices, and unnecessarily detailed explanation that may obscure the purpose of the present invention are omitted. It is also to be understood that descriptions of the present invention are provided to give more complete explanation to a person of ordinary skill in the art. Therefore, the shape and size of the elements in the drawings may also be exaggerated for clearer explanation.

As mentioned above, the goal of the positioning system of the present invention is to accurately obtain the current position of a user in outdoor or indoor spaces. In order to achieve this goal, the present invention proposes a network of nodes with one or more signaling nodes, where a portable terminal that a user carries can determine the current position based on signals transmitted from signaling nodes. The basic concept of the node network of the present invention is described in FIGS. 1 and 2 below.

FIG. 1 is a view showing a map and signaling nodes that is provided to the terminal device according to a preferred embodiment of the present invention. As shown in FIG. 1, one or more signaling node 200 can be installed in the space. As described above, the present invention is characterized by receiving signals from signaling nodes 200 and determining the user's position from signals received.

However, unlike outdoor spaces, indoor spaces may be obstructed by walls and other materials that may cause decrease in signal strength from signaling nodes 200. Therefore, signaling nodes 200 may be installed in great number in tight spaces such as the area 950, 954, 956, and 960 or installed in relatively small number in big spaces such as the area 961 and 962.

One or more signaling nodes 200, that were installed as describe above, transmit repeated signals with the same intensity when they receive a location request signal. Signals transmitted by a signaling node 200 can be invisible light, sound wave or RF signals. And, these signals can include ID and location information of the each signaling node. In other words, based on the characteristics that all emitted signals from one or more signaling devices 200 at a fixed position have an equal intensity, the user can determine his or her position when the user receives signals transmitted from one or more signaling nodes 200, by utilizing the received signal strength and the location information of each signaling nodes. This characterizes the basic concept of a node network according to an embodiment of the present invention.

Figure 2:
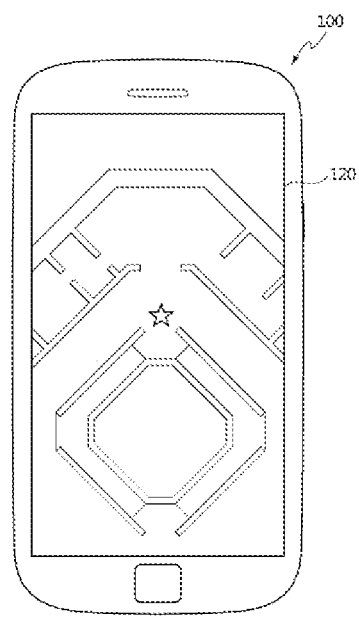
FIG. 2 is a view showing a user on a map displayed on the terminal according to an embodiment of the present invention.

For example, if the user is located in the area 957, the portable terminal 100 will receive signals from nodes in the area 957 along with signals from adjacent areas such as 955, 956 and 958. In such a case, the intensity of signals from nodes in the area 957 will be relatively high and the intensity of signals from nodes in the area 955, 956, and 958 will be relatively low, which leads to a clue that the user is in the area 957. Furthermore, the user can also determine even more specific position based on the received signal strength and coordinates of signaling nodes through a pre-programmed algorithm with the terminal 100. More detailed description will be described with reference to FIG. 3 below. The current position of the user can now be displayed on the display 120 of the terminal 100 as shown in FIG. 2.

Figure 3:
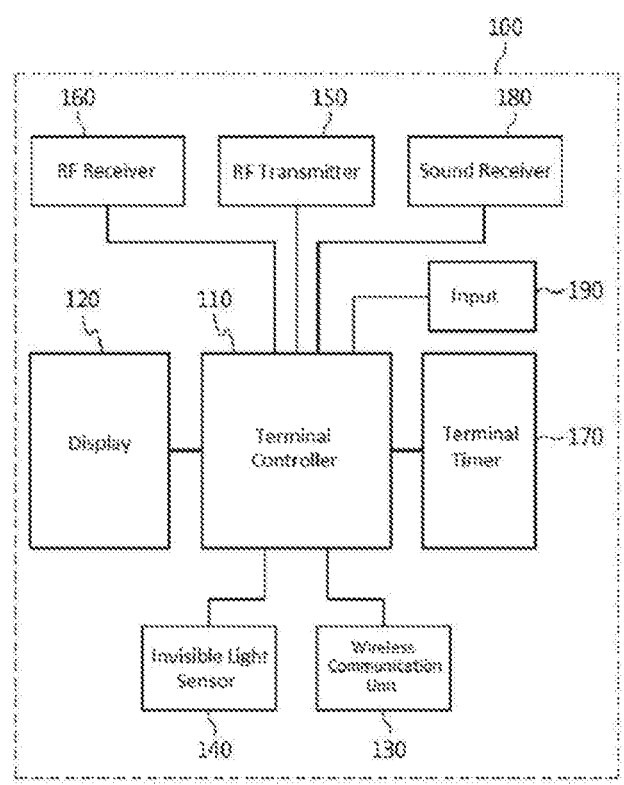
FIG. 3 is a block diagram of a terminal according to an embodiment of the present invention.

FIG. 3 is a block diagram of the terminal 100 according to a preferred embodiment of the present invention. As noted above, the terminal 100 serves the purpose of providing user's position who carries the terminal 100 based on signals transmitted from one or more signaling nodes 200. To attain this end, the terminal 100 can include a terminal controller 110, a display 120, a wireless communication unit 130, an invisible light sensor 140, a RF transmitter 150, an RF receiver 160, a terminal timer 170, a sound receiver 180, and an input 190. Hereinafter, descriptions are made for each of the components included in the terminal 100.

The terminal controller 110 serves a function to determine the position of the user carrying a device of the present invention based on received signals transmitted from one or more signaling nodes. Before this procedure is performed, a process is made to transmit a location request signal through the RF transmitter 150 to be received by one or more signaling nodes.

Signals transmitted from one or more signaling nodes mentioned above include location information of the signaling node that transmitted the signal. As described previously with reference to FIG. 1, signals received from one or more signaling nodes can be either invisible light, sound or RF signal. Invisible light signals can be detected by the invisible light sensor 140. Sound wave can be received by the sound receiver 180. RF signal can be received by RF receiver 160. Since all signals from one or more signaling nodes started with the same intensity, the terminal controller 110 can measure the distance between the user and the each signaling nodes from the value of the received signal strength.

Additionally, when the terminal controller 110 receives either invisible light, sound or RF signals from one or more signaling nodes, the order of priority for calculation can be light signal, sound wave, and RF signal. Although the order of priority can be different according to the user's policy, it is preferable to keep the order of light, sound, and RF signal since there are differences in characteristics such as diffraction and permeability of the medium.

Hereafter, a description for deriving the user's position using invisible light signals with the same luminosity will be given and an embodiment of a terminal 100 receiving invisible light with the same intensity transmitted from one or more signaling nodes is described below. The term invisible light in the following description may include at least one of any infrared rays and ultraviolet rays. In other words, invisible light can be at least one of many types of lights such as near infrared ray, infrared ray, far infrared ray, near ultraviolet ray, ultraviolet ray, and far ultraviolet rays. Invisible light signal emitted from signaling nodes 200 discussed above may carry the location information of the signaling node as well as latitude, longitude, altitude, and ID of the terminal that made a request for location.

The invisible light signal from a signaling node carries a variety of information. Therefore, the terminal controller 110 can find out from which signaling node the light signal had been emitted, when the invisible light is detected from the invisible light sensor 140. In addition, since the signal strength of the invisible light had a pre-determined strength, a level of decrease in signal strength can be measured by comparing the original signal strength and the received signal strength. Since the decrease in signal strength is proportional to the traveled distance, the distance between the terminal 100 and a signaling node can be determined from the signal strength received by the invisible light sensor 140.

Methods to determine the user's position by the terminal controller 110 based on the number of invisible light signals detected through the invisible light sensor 140 are described hereafter.

Figure 7:
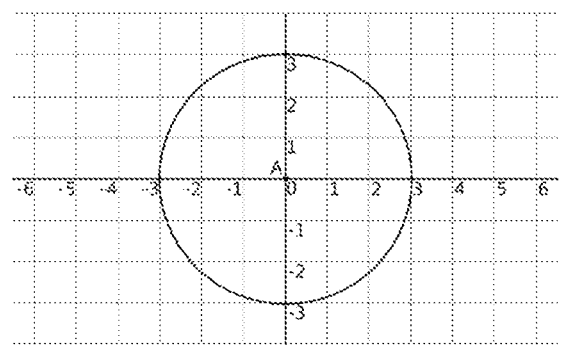
FIGS. 7 to 14 are diagrams that are illustrating methods to calculate the user's position using the received signal strength values of invisible light, sound or RF signals according to an embodiment of the present invention.

Firstly, if the invisible light sensor 140 detects only one invisible light signal, as shown in FIG. 7, the terminal controller 110 regards the coordinates A of the signaling node as the user's position, and may draw a circle as the margin of error with the radius being the distance estimated by the received signal strength. One tick mark in the graph represents 10M. Therefore, the user's position in the graph is represented as being located somewhere within the circle with the center being at the point A and the radius being 30M.

Figure 8:
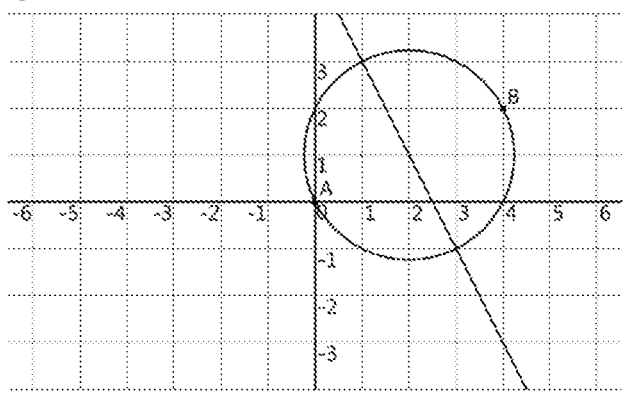

The method of representation of the user's position, when the invisible light sensor 140 detects two invisible light signals, and when the received signal strength of these two signals are same or similar enough to fall within the predetermined error range, is described in FIG. 8. Two signaling nodes are arbitrarily called as points A and B for convenience. The user's position is then represented as a circle with A and B as points lying on the opposite ends of the circle and the diameter being the distance between points A and B as shown in FIG. 8.

Figure 9:
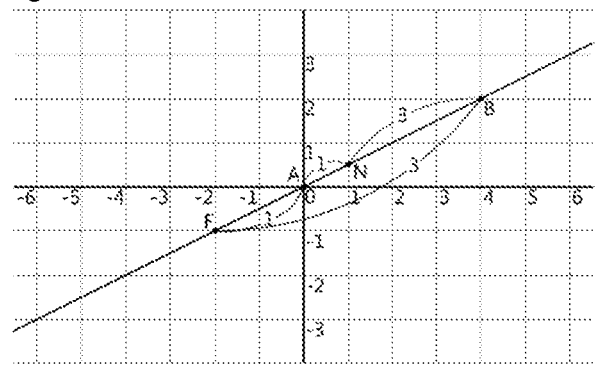
Figure 11:
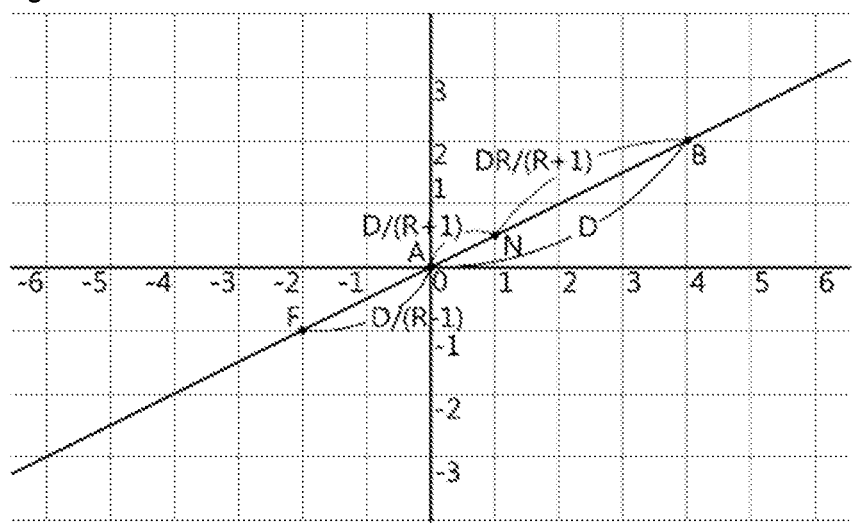

FIGS. 9 and 11 are used to illustrate the method when two received signal strength are different. In FIG. 9, the signaling node that has a bigger signal is designated as the point A while the other signaling node as the point B. To help illustrate the method of calculation, the ratio of the two received signal strength is arbitrarily given as 1:3. In such a case, the nearest possible position of the user from the origin is at the point N (the internal division point of the line-segment AB in the ratio 1:3) lying on a straight line between A and B. The farthest possible position of the user is at the point F (the external division point of the line-segment AB in 1:3).

Figure 10:
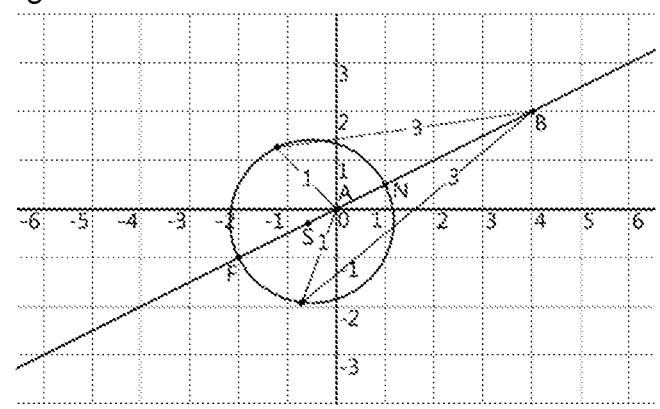

Since the user can be located outside the straight line AB, the user's position can be represented as a circle with points N and F lying the opposite ends, as shown in FIG. 10.

With regards to FIG. 11, if the received signal strength from A and B are denoted as sA and sB respectively, and the ratio of signals sA/sB as R, and the distance between A and B as D, then the distance between N and A is $D/(R+1)$. And the distance between A and F is $D/(R-1)$.

If the x-coordinate of B is called xB, and the y-coordinate is called yB, then the user's position, as shown in FIG. 10, can be represented as a circle with the center being $S(-xB/(R^2-1), -yB/(R^2-1))$ and the radius being $D*R/(R^2-1)$. In such a case, the coordinates for N would be $(xB/(R+1), yB/(R+1))$ and the coordinates for F would be $(-(xB/(R-1)), -(yB/(R-1)))$.

Therefore, a circle to be displayed on the terminal, when different received signal strengths are received from two signaling nodes, can be derived from the signal strength ratio and the distance between two nodes by using the Equation 1 below.

$$\left(x + \left(\frac{xB}{R^2-1}\right)\right)^2 + \left(Y + \left(\frac{yB}{R^2-1}\right)\right)^2 = \left(Dx\frac{R}{R^2-1}\right)^2 \quad \text{(Equation 1)}$$

If three invisible light signals are received through the invisible light sensor 140, the signaling node with the highest intensity is indicated as A and remaining nodes as B and C. In this case, an equation of a circle can be obtained through the equation 1 based on the ratio of the received signal strength of A and B. Another equation for a circle can be obtained through the equation 1 based on the ratio of the received signal strength of A and C.

Figure 12:
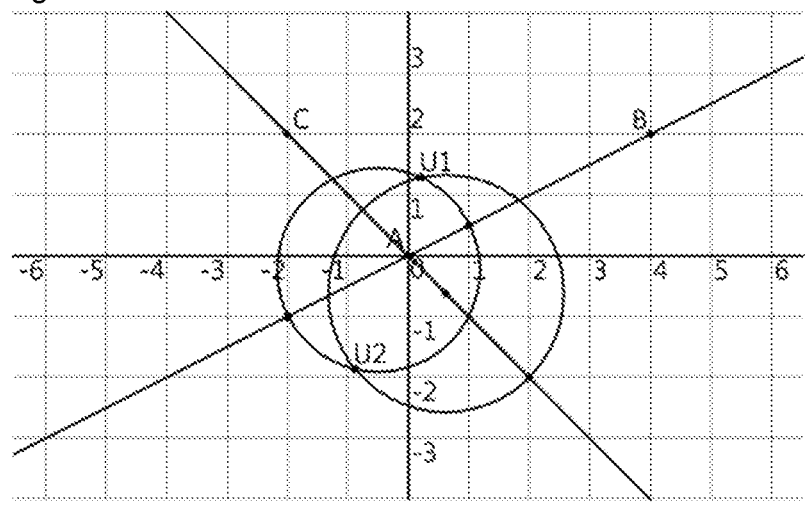

As shown in FIG. 12, the user's position are narrowed down to two intersections of two circles denoted as U1 and U2. The user's position to be displayed on the terminal is represented as a circle with the center being the closer one to the previous position of the user among U1 and U2, and the radius being the distance between U1 and U2. In case there is no information about the previous location, a circle with U1 and U2 as two points at the opposite end is represented as the user's position.

Figure 13:
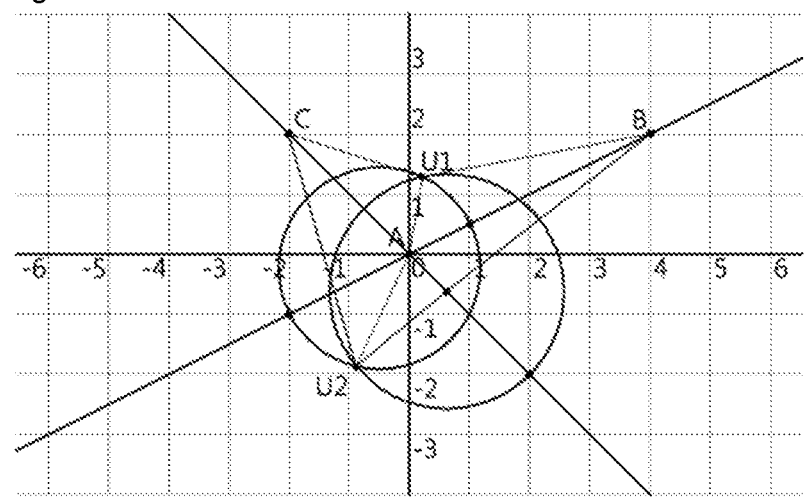

As shown in FIG. 13, one of U1 and U2 is located inside the triangle with vertices A, B, and C, and the other outside the triangle.

Figure 14:
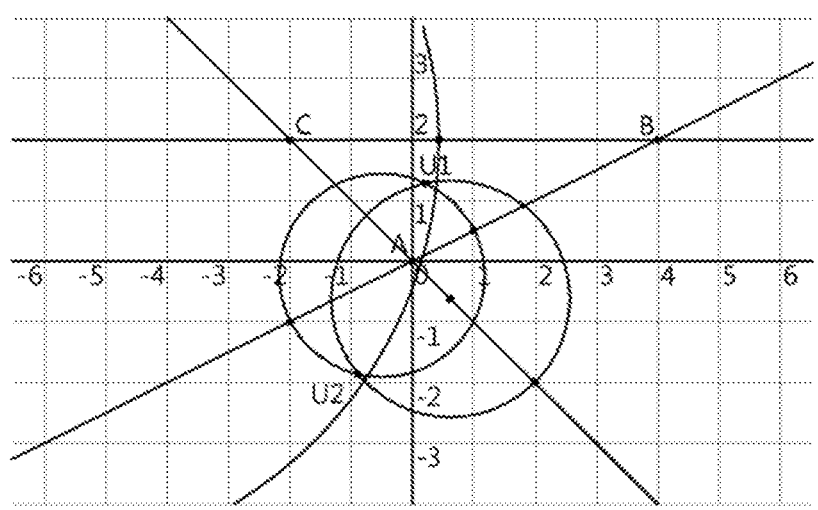

As shown in FIG. 14, an equation for one more circle, based on the ratio of the received signal strength between B and C, can be obtained in addition to two circles obtained from the ratio of received signal strength between A and B as well as A and C. However, intersections of the new circle with the other two circles still remain U1 and U2 as shown in FIG. 12. (In other words, when the calculation is solely relying on the ratios of signal strength from three points while not knowing the exact distances between the user and the nodes, one cannot localize the user to a single point. This is why the equation for the circle between B and C was not necessary in paragraph 52.)

When four invisible light signals detected, four circles based on the ratios of received signal strength between A and B, between A and C, between B and C, and between C and D, can be obtained yielding a single common intersection from four circles. Therefore, it is to be understood that four or more signals are needed in order to come up with the user's position with relatively high accuracy when the calculation is based on ratios of received signal strength only.

Above descriptions can not only used for invisible light transmitted with the same intensity, but also can be applied to one or more sound signals transmitted with the same intensity that are detected by the sound receiver 180. Similarly, same methods can be used for one or more RF signals transmitted with the same intensity that are detected by RF receiver 160.

As described above, the location-tracking method through the terminal 100 according to a preferred embodiment of the present invention has an advantage of not having to synchronize timers of each signaling nodes or the terminal 100. Furthermore, since the present invention relies only on the received signal strength and location of signaling nodes, the terminal 100 in accordance with a preferred embodiment of the present invention does not need the value of original signal strength included in the signal or measure the time with timers.

Figure 4:
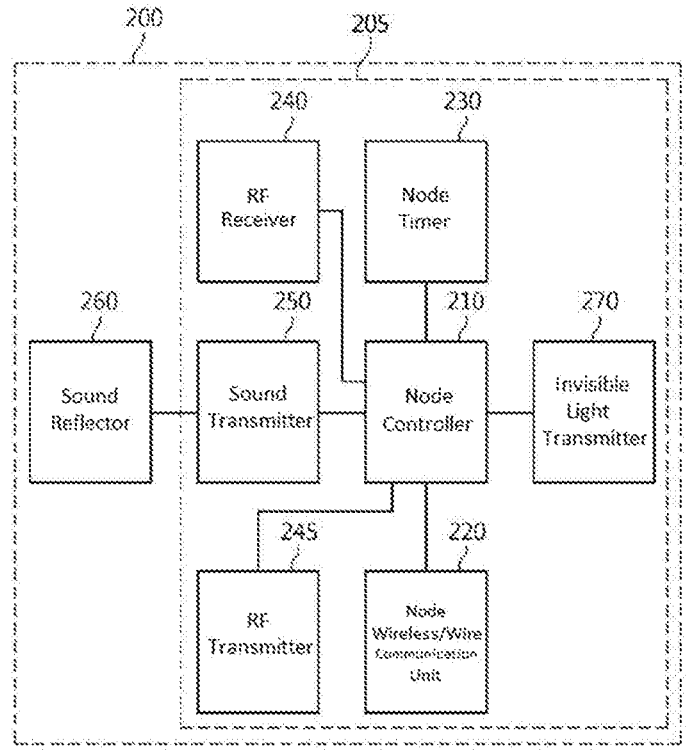
FIG. 4 is a block diagram of a signaling node according to an embodiment of the present invention.

FIG. 4 is a block diagram for a signaling node 200 according to a preferred embodiment of the present invention. As mentioned above, a plurality of the signaling node 200 can be installed and these signaling nodes would transmit signals carrying the location information of each one. The signal to be transmitted by these signaling nodes may be in the form of invisible light, sound, and radio waves, each of which may have the same signal strength. Additionally, these signals can be transmitted through different channels to be distinguished from each other. To attain this objective, the signaling node 200 according to a preferred embodiment of the present invention includes a main body 205 and a sound reflector 260. In addition, the main body 205 of the signaling node 200 in accordance with a preferred embodiment of the present invention includes a node controller 210, a wireless/wire communication unit 220, a node timer 230, an RF receiver 240, a RF transmitter 245, and a sound transmitter 250. Hereafter, descriptions are made for a signaling node 200 according to a preferred embodiment of the present invention.

Node controller 210 controls the overall operation of the signaling node 200. Node controller 210 emits invisible light signals through the invisible light transmitter 270 and transmit sound wave signals through a sound transmitter 250. The node timer 230 is used to provide the time of transmission of the sound signal, and the RF receiver 240 is used to receive location request signals from the terminal 100.

RF transmitter 245 emits RF signals to the terminal 100. In addition, upon receiving a location request signal from the terminal 100, the RF transmitter 245 can transmit a radio wave signal that carries data including a unique ID, latitude, longitude, altitude, channels, ID of the terminal that sent the location request, time of transmission, channel of invisible light, channel of sound signal, etc.

The sound transmitter 250 transmits sound wave signals to be received by the terminal 100. In addition, the sound transmitter 250, as with the RF transmitter 245, can transmit signals that carry data including a unique ID, latitude, longitude, altitude, channel, time of transmission, ID of the terminal that sent a location request signal, etc.

The invisible light transmitter 270 emits invisible light signals to be detected by the terminal 100. The invisible light transmitter 270 according to a preferred embodiment of the present invention, can emit an invisible light signal that carry data with unique ID of the signaling node 200, latitude, longitude, altitude, channel, time of emission, ID of the terminal that requested the location information, etc.

Sound reflector 260 functions to diffuse the sound waves originating from the sound transmitter 250 in all directions.

Figure 5:
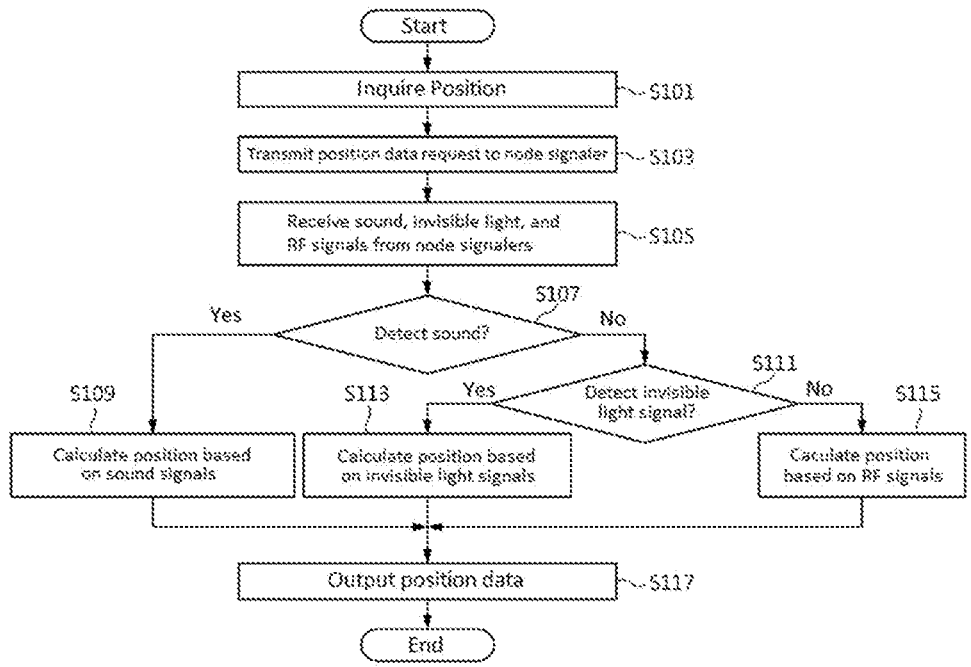
FIG. 5 is a flowchart for the method of providing the location information according to an embodiment of the present invention.
Figure 6:
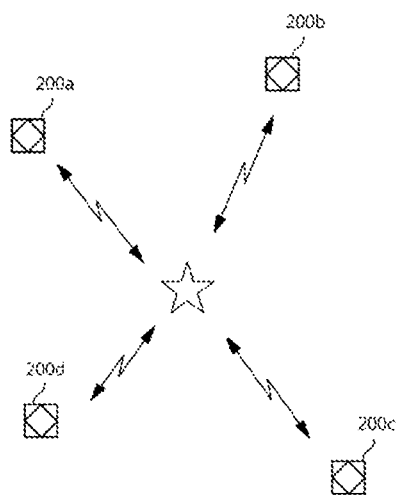
FIG. 6 is a view showing the transmitter sending a location request signal to signaling nodes and receiving invisible light, sound, and RF signals from signaling nodes according to an embodiment of the present invention.

The followings describe a method of providing position information in accordance with a preferred embodiment of the present invention with reference to FIGS. 5 and 6. FIG. 5 is a flowchart for a method of providing location information in accordance with a preferred embodiment of the present invention. It is to be understood that repeated descriptions mentioned above and duplicates are omitted in following descriptions.

Firstly, at operation S101, user's input to request location signals is entered through the input 190 or the display 120. Then, the RF transmitter 150 transmits a location request signal to one or more signaling nodes 200 which is denoted as operation S103. A location request signal transmitted at operation S103 may include any data needed for requesting the location information. This data may include various information including the terminal ID.

Afterwards, operation S105 takes place where signals transmitted from one or more signaling nodes are received. As mentioned above, signals transmitted from one or more signaling nodes may be in the form of invisible light, sound, and RF signal, which have the same signal strength. In order to distinguish which signal was transmitted from which signaling node, these signals are sent through different channels. In case invisible light or sound signals are too weak that data such as latitude, longitude, altitude, etc. can't be discerned and only the channel and the received signal strength can be recognized, channel information of invisible light and sound signals can be included in the RF signal in addition.

Operation S107, that determines whether a sound signal is received through the sound receiver 180, is performed afterwards. If the sound wave is received, the process advances to operation S109 and calculate the terminal's position on the basis of sound signals. If not, the process goes to operation S111 to determine if invisible light signals are detected.

If all three signals are detected as the user operates the device, it's possible to use any preferred medium to obtain the position information. The location of the terminal can be traced through, preferably in the order of, invisible light, sound wave, and radio wave.

Operations S109, S113, and S115 are stages to calculate the location of the terminal that user carries based on invisible sound, light, and RF signals respectively. Since descriptions of these processes were made above, description thereof will not be repeated.

Afterwards, operation S117 is performed which will output the position data calculated through operation S109, S113 or S115.

FIG. 6 is a view showing a terminal transmitting a location request signal to signaling nodes and receiving invisible light, sound, and RF signals from signaling nodes in return. To be more specific, FIG. 6 illustrates an example where the terminal 100 receives any one among invisible light, sound, and RF signals from the four signaling nodes 200a, 200b, 200c, and 200d.

Under the assumption that the signaling nodes (200a, 200b, 200c, and 200d) shown in FIG. 6 transmit invisible light, sound, and RF signals each with the same signal strength, the terminal controller 110 measures the received signal strength between the terminal 100 and each signaling nodes (200a, 200b, 200c, and 200d) to calculate the position of the terminal 100.

The terminal controller 110 in accordance with a preferred embodiment of the present invention calculates the position of the terminal 100 based on at least one out of three media among invisible light, sound, and RF signals which were transmitted upon receiving a location request signal. Since the methods to track the user's location through the above signals were described in detail previously, descriptions for these methods will be omitted.

Although a preferred embodiment of the present invention has been described in detail, it will be understood that the scope of the present invention is not limited to the above described embodiment, and any variations and modifications by a person having ordinary skill in the art using the basic concept and spirit defined in following claims are within the scope of the present invention.

What is claimed is:

1. A positioning system that determines its position based on invisible light, sound, and radio frequency signals each with the same intensity through different channels from one or more signaling nodes in an indoor space, comprising:

a signal transmitter that sends a signal to request location information to one or more signaling nodes, wherein the one or more signaling nodes emits an invisible light signal of the same intensity; and an invisible light sensor that detects invisible light rays from one or more signaling nodes, which emit signals with the same intensity, carrying location data of each signaling node upon receiving a request to transmit a location data signal;

a position calculation unit that calculates a terminal's position based on at least one received signal strength from the one or more signaling nodes above;

a sound receiver that receives at least one sound signal transmitted from one or more signaling nodes, each transmitting a signal with the same intensity on different channels, where the position calculation unit calculates the user's location from one or more sound signals, when the above invisible light signal was not detected; and a radio frequency receiver that receives at least one radio frequency signal transmitted from one or more signaling nodes that received the location request signal, each transmitting a signal with the same intensity on different channels, where the position calculation unit calculates the user's location from one or more radio frequency signals, when the invisible light and the sound signals were not detected;

wherein the order of priority for the position calculation is light signal, sound wave, and RF signal;

wherein the invisible light rays is selected from the group consisting of: infrared or ultraviolet light; and wherein the position calculation unit obtains a user's position based on the ratios of degree of decrease in signal strength of the invisible light signals with the same signal intensity which is proportional to the distance.

2. The system of claim 1, wherein the above position calculation unit, in the event only one invisible light signal is received, calculates the distance from the received signal strength, and draws a circle, with the center being the location of the signaling node that transmitted the detected invisible signal and the radius being the above calculated distance, as the position of the above user.

3. The system of claim 1, where in the above position calculation unit, in the event two invisible light signals that have different level of received signal strength were detected without time synchronization, calculates the position of the above user through the following equation 1

$$\left(x+\left(\frac{xB}{R^2-1}\right)\right)^2+\left(Y+\left(\frac{yB}{R^2-1}\right)\right)^2=\left(Dx\frac{R}{R^2-1}\right)^2 \quad \text{(Equation 1)}$$

(Two invisible light signals above are received from a node A and a node B. xB is the x-axis coordinate or node B on the assumption that the node A is the origin, whereas yB is the y-coordinate of the node B. R is the ratio of received signal strength of the node A and the node B. D is the distance between the node A and the node B.).

4. The system of claim 3, wherein the above position calculation unit, when three invisible light signals are received without time synchronization, calculates two intersecting points of circles derived from the above equation 1, and draws a circle, with the center being one of two points that was closer to the user's previous location and the radius being the distance between these two points, as the user's position.

5. The system of claim 3, wherein the above position calculation unit, when four or more invisible light signals are received without time synchronization, determines the above user's position from one intersecting point of circles derived from the above equation 1 based on the location data and the received signal strength of four or more invisible light signals emitted from four or more signaling nodes.

6. A positioning system; and a node network that includes one or more signaling nodes that transmit invisible light, sound, and radio frequency signals that carry data comprising unique ID, longitude, latitude, altitude, channel, time of transmission, ID of the device that made a transmission request to be received by the terminal; and a signal transmission unit sends a signal to request location information to one or more signaling nodes; and an invisible light detection unit that detects one or more invisible light signals emitted with the same intensity on different channels from one or more signaling nodes that have received the location request signal; and a position calculation unit that calculates the user's position based on one or more invisible light signals of the node network in the order of light signal, sound wave, and RF signal.

* * * * *